United States Patent [19]

Grunewald

[11] Patent Number: 4,624,479
[45] Date of Patent: Nov. 25, 1986

[54] SEAT BELT FITTING

[75] Inventor: Hans-Joachim Grunewald, Kiebtzreihe, Fed. Rep. of Germany

[73] Assignee: Autoliv Development AB, Vargarda, Sweden

[21] Appl. No.: 673,867

[22] Filed: Nov. 21, 1984

[51] Int. Cl.⁴ ............................................. B60R 22/00
[52] U.S. Cl. ...................................... 280/808; 280/801
[58] Field of Search .................. 280/808, 801; 267/59, 267/62, 156

[56] References Cited

U.S. PATENT DOCUMENTS

| | | | |
|---|---|---|---|
| 2,635,282 | 4/1953 | Trammell, Sr. et al. | 267/156 |
| 3,103,034 | 9/1963 | Fisher | 267/156 |
| 3,666,220 | 5/1972 | Rider | 267/156 |
| 4,135,737 | 1/1979 | Scholz et al. | 280/808 |
| 4,173,357 | 11/1979 | John et al. | 280/808 |

FOREIGN PATENT DOCUMENTS 2720789 11/1978 Fed. Rep. of Germany ...... 280/808

Primary Examiner—John J. Love
Assistant Examiner—Ross Weaver
Attorney, Agent, or Firm—Spencer & Frank

[57] ABSTRACT

A seat belt fitting is provided which comprises a guide element mounted on a carriage that is movable along a rail or the like. The rail may be mounted on the "B" post of an automobile so that the position of the guide element can be adjusted up-and-down relative to the shoulder of a person sitting in the automobile. The carriage can be selectively retained in a plurality of different positions along the rail. In the invention a spring strip has one end connected to the carriage, and the other end wound into a spiral. The spiral portion of the spring is retained in a predetermined position and the spring imparts a bias to the carriage tending to cancel out a bias supplied to the carriage by the seat belt.

10 Claims, 2 Drawing Figures

U.S. Patent  Nov. 25, 1986  4,624,479
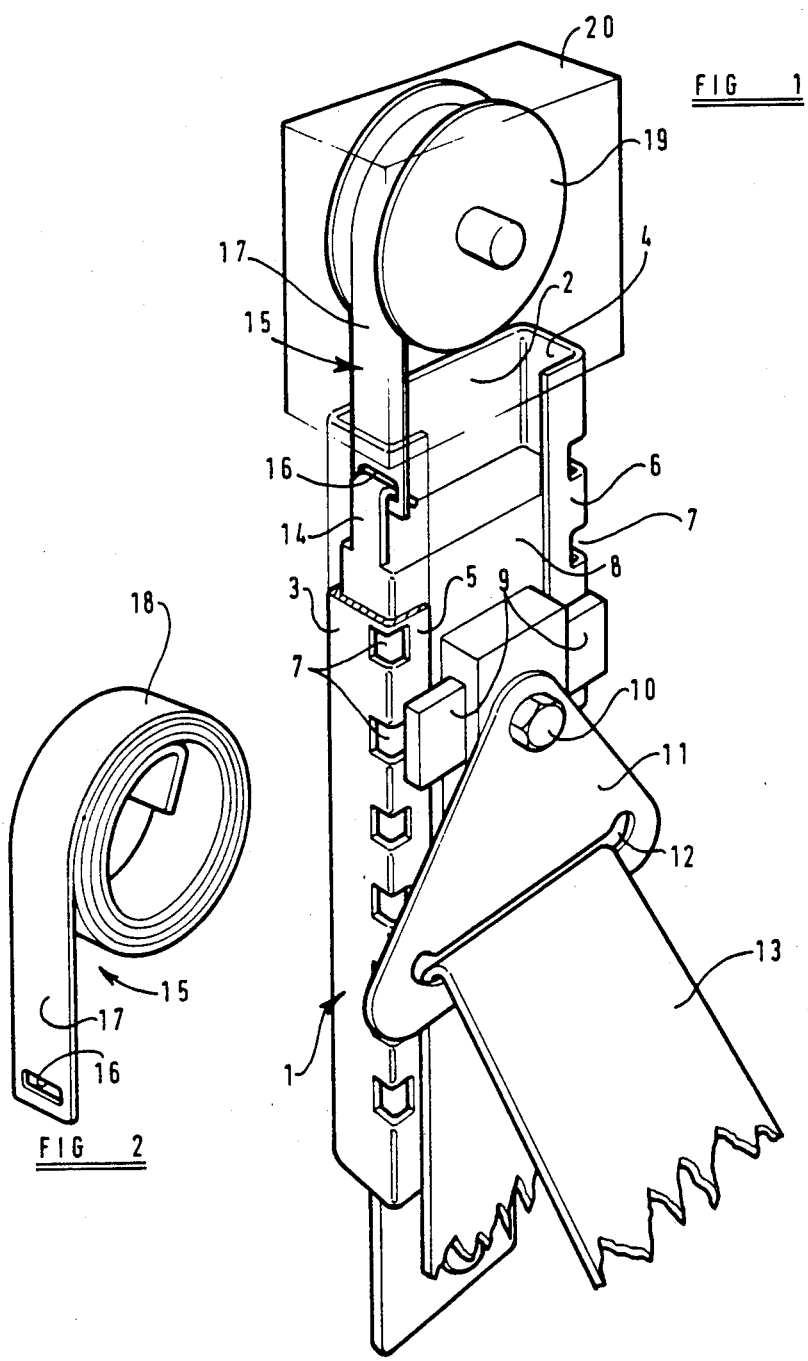

SEAT BELT FITTING

BACKGROUND TO THE INVENTION

The present invention relates to a seat belt fitting and more particularly the present invention relates to an adjustable fitting which can be utilised to adjust the height at which a diagonal portion of a seat belt fitted to the front seat of a motor vehicle is effectively connected to the "B" post and/or which can be utilised with a seat belt fitted in the rear of a motor vehicle.

THE PRIOR ART

At the present time it is common to utilise a front seat belt consisting of a lap-and-diagonal belt. Such a belt has one end thereof anchored in position adjacent the base of the "B" post of the door of the vehicle, and the belt also passes slidably through a guide plate located adjacent the top of the "B" post, the other end of the belt being connected to a retractor reel which is again located adjacent the base of the "B" post. A tongue or the like is mounted on the belt, and when the belt is used the tongue is drawn across the lap of the person utilising the seat belt, and the tongue is then inserted in a buckle which is rigidly connected to the chassis of the motor vehicle on the side of the seat which is remote from the "B" post. When this sequence of events is performed, part of the seat belt extends across the lap of the person wearing the seat belt, and another part extends, from the tongue diagonally across the chest of the wearer of the seat belt, to the plate this is located adjacent the top of the "B" post. It is also becoming common to use a correspondingly designed belt in the rear seat of a motor vehicle.

Such seat belts are commonly provided in motor cars, and it has been proposed that the position of the upper guide plate should be adjustable, thus enabling the precise positioning of the diagonal portion of the belt to be adjusted, having regard to the height or size of the person wearing the seat belt. Thus previously it has been proposed to mount a short length of track, or the like, on the "B" post in the case of a front seat belt, and to have the upper plate mounted on a carriage that can slide along the track and be locked in a selected one of a plurality of possible positions. One disadvantage with such an arrangement is that when the guide plate is moved downwardly, the seat belt retractor reel will draw in a portion of the seat belt, thus effectively assisting the downward movement of the plate and the associated carriage. However, when the guide plate is moved upwardly, the upward movement is effected against the downward bias provided by the retractor reel, and thus a considerable force must be applied to the slidable carriage to move it upwardly against this bias.

As will be appreciated the slidable carriage is located just above the shoulder of a person sitting in the seat, who is to wear the seat belt, and it is only when the person is in this position that the position of the carriage will be adjusted. It is very awkward for a person to grasp manually an item that is located immediately adjacent their shoulder and then move that item upwardly against a downward bias. Thus people tend not to utilise the adjustable provision that has been made.

BRIEF SUMMARY OF THE INVENTION

According to this invention there is provided a seat belt arrangement comprising a guide element through which part of the seat belt passes, the guide element being mounted on a carriage that is movable along a rail or the like, the carriage being selectively retainable or lockable in a plurality of positions along said rail, means being provided to impart a bias to the carriage against any bias applied thereto by the seat belt, said bias imparting means comprising a spring strip, one end of which is connected to the carriage and the other end of which is wound into a spiral, the portion of the spring wound in a spiral being retained at substantially a predetermined position.

Said spiral portion of the strip may be wound about a member defining the axis of the spiral. The member may be a simple rod or axle, or may be a spool or reel. However, it may not be essential to provide such a member, and thus it may well be sufficient if the spiral portion is retained within a cavity formed within a housing.

Preferably said carriage is provided with a hook-like element which engages an aperture formed in said one end of the spring strip.

Conveniently the spring strip is formed of steel, and is of substantially rectangular cross section. The strips may be flat or slightly arcuate in cross section.

Advantageously said rail comprises a channel along which the carriage may slide, the channel being provided with a plurality of apertures therein and the carriage being provided with releasable means to engage said apertures.

According to another aspect of this invention there is provided a seat belt arrangement comprising a guide element through which part of the seat belt passes, the guide element being mounted on a carriage that is movable along a rail or the like, the carriage being selectively retainable or lockable in a plurality of positions along said rail, means being provided to impart a bias to the carriage against any bias applied thereto by the seat belt.

The bias imparting means may comprise a spring strip, which may be of a specific configuration, or may comprise some other resilient element, such as an element of rubber, elastic or some other resilient material.

BRIEF DESCRIPTION OF THE DRAWINGS

In order that the present invention may be more readily understood, and so that further features thereof may be appreciated, the invention will now be described with reference to the accompanying drawings in which;

FIG. 1 is a perspective view, with parts shown in phantom, of one embodiment of the invention, and FIG. 2 is a perspective view of the spring that forms an important part of the embodiment of FIG. 1.

DESCRIPTION OF PREFERRED EMBODIMENT

Referring to the accompanying drawings, a channel 1 is provided which is intended to be mounted on the "B" post of a motor vehicle. The channel has a flat base portion 2, and two upstanding side walls 3, 4 which terminate with inwardly directed flanges 5, 6. A plurality of apertures are formed in the channel, each aperture being formed partly in a side wall 3 or 4 and partly in the adjacent flange 5 or 6. The apertures 7 are shown as being of generally square configuration and are evenly spaced, the apertures 7 in the side wall 3 and the flange 5 being coaligned with a corresponding apertures in the side wall 4 and the flange 6.

A carriage 8 is provided which can move slidably along the channel. The carriage 8 is provided with means (not shown) for releasably engaging the apertures 7 to lock the carriage in a selected one of a plurality of possible positions. The engagement means can be dis-engaged by pressing inwardly two spring biassed buttons 9, and when these buttons 9 have been pressed inwardly the carriage can move upwardly and downwardly, the carriage being re-locked in position by releasing the buttons.

Securely bolted to the carriage by means of bolt 10 is a triangular plate 11 having a horizontal oval slot 12 located adjacent the lowermost edge thereof. Part of a seat belt 13 slidably passes through the slot 12.

As will be appreciated the seat belt 13 forms part of a conventional lap-and-diagonal seat belt arrangement, but the positioning of the upper end of the diagonal portion of the seat belt may be adjusted by moving the carriage 8 up or down the channel 1.

The uppermost end of the carriage 8 is provided with a hook-like projection 14, to which is connected one end of a spring steel strip 15 which is of substantially flat rectangular cross section. The said one end of the spring strip 15 is provided with an aperture 16 through which the hook-like portion is engaged. The spring strip has an initial linear portion 17, which merges into a spirally wound portion 18. The linear portion 17 is thus tangential to the outermost turn of the spirally wound portion 18. At all time the long sides of the flat cross section of the strip are substantially parallel with the axis of the spiral.

As shown in the accompanying drawing, the spiral portion 18 of the spring is retained on a spool 19 which is accommodated within a housing 20, but it is to be appreciated that this is only one preferred embodiment of the invention. The spiral portion 18 may just be retained within a appropriate cavity within the housing and need not be mounted on any axle, spool or the like.

It has been found that the spring bias provided by a spirally wound spring strip when the strip is extended by applying a tangential force to one end of the spring is substantially linear over a substantial range of extension of the spring strip.

It will be appreciated that once the spring strip 15 has been slightly extended the spring strip 15 provides an upward bias to the carriage 8, and the magnitude of that upward bias is not dependent upon the position of the carriage 8, i.e. is not dependent upon the amount of extension of the spring strip 15. The strength of the spring strip 15 is thus selected, in any particular instance, substantially to balance the downward bias exerted on the carriage 8 by means of the seat belt retractor reel (which is not shown). Thus, movement of the carriage both upwards and downwards is facilitated, since such movement of the carriage is then effected in substantially bias-free conditions. This ease of adjustment will encourage users to adjust the seat belt according to their size or height, leading to greater comfort and, in the event of an accident, greater safety.

Whilst the invnetion has been described with reference to an embodiment to be mounted on a "B" post for use with a front seat belt, the invention may equally be used with a rear seat belt.

What I claim:

1. A seat belt arrangement comprising a guide element through which part of the seat belt passes, the guide element being mounted on a carriage that is movable along a rail or the like, manually operable means being provided on the carriage for selectively locking or retaining the carriage in a plurality of positions along said rail, means being provided to impart a bias to the carriage against any bias applied thereto by the seat belt, said bias imparting means comprising a spring strip, one end of which is connected to the carriage and the other end of which is wound into a spiral, the portion of the spring wound in a spiral being retained at substantially a predetermined position.

2. An arrangement according to claim 1 wherein said spiral portion of the strip is wound about a member defining the axis of the spiral.

3. A seat belt arrangement according to claim 1 wherein the spiral partition of the strip is wound on a spool or reel.

4. A seat belt arrangement according to claim 1 wherein the said spiral portion of the strip is retained within a cavity formed within a housing.

5. A seat belt arrangement according to claim 1 wherein said carriage is provided with a hook-like element which engages an aperture formed in said one end of the spring strip.

6. A seat belt arrangement according to claim 1 wherein the spring strip is formed of steel.

7. A seat belt arrangement according to claim 1 wherein the strip is of substantially rectangular cross section.

8. A seat belt arrangement according to claim 1 wherein said rail comprises a channel along which the carriage may slide, the channel being provided with a plurality of apertures therein and the carriage being provided with releasable means to engage said apertures.

9. A seat belt arrangement comprising a guide element through which part of the seat belt passes, the guide element being mounted on a carriage that is movable along a rail or the like, manually operable means being provided on the carriage for selectively locking or retaining the carriage in a plurality of positions along said rail, means being provided to impart a bias to the carriage against any bias applied thereto by the seat belt.

10. An arrangement according to claim 9 wherein said bias imparting means comprising a spring strip, one end of which is connected to the carriage.

* * * * *